Sept. 22, 1959 J. W. COOKSTON 2,905,545
METHOD OF SEPARATING METALS FROM ORES AND CONCENTRATES
Filed May 17, 1956
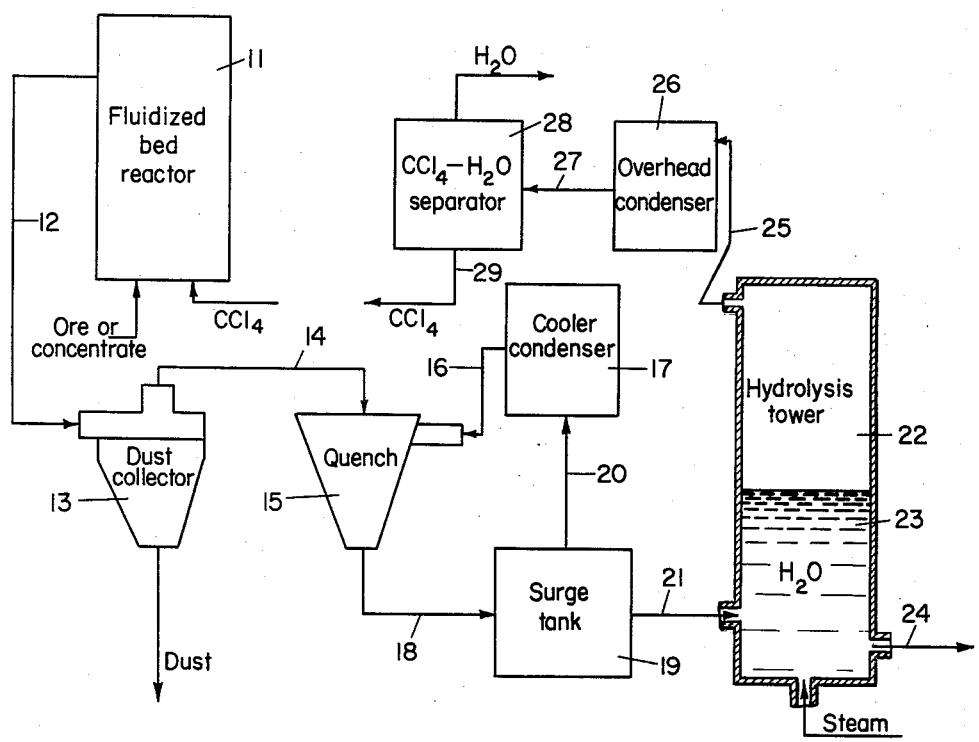
INVENTOR.
Jack W. Cookston
ATTORNEYS.

United States Patent Office 2,905,545
Patented Sept. 22, 1959

2,905,545

METHOD OF SEPARATING METALS FROM ORES AND CONCENTRATES

Jack W. Cookston, Columbus, Ohio, assignor, by mesne assignments, to Nova Beaucage Mines Limited (N.P.L.), North Bay, Ontario, Canada, a corporation of Ontario, Canada Application May 17, 1956, Serial No. 585,520

13 Claims. (Cl. 75—1)

This invention relates to a method of efficiently separating selected metals from ores and concentrates and particularly to a method of separating columbium from low-grade materials.

Halogenation processes have long been employed to form halogen compounds with metals in ores and concentrates. In these processes ores or concentrates are commonly supplied to a reaction chamber with the halogenation agent where under heat and pressure metals form gaseous metal halides along with other gaseous elements. The desired metal halides are then conventionally recovered from the gaseous product by controlled condensation.

The difficulties encountered in employing these prior methods of securing selected metal halides from concentrates and ores are numerous. For example, if an excess of the required amount of reagent is employed a portion of expensive reactant or halide is lost. If the exact amount of reacting elements present in the ore or concentrate are carefully determined and only a sufficient amount of halide is supplied to the reaction chamber to effect a complete reaction it is necessary to employ high temperatures or high pressures or both to complete the reaction. The latter is particularly the case where it is desired to secure selected metals from low-grade ores or concentrates.

When attempting to halogenate metals present in low-grade materials, it is necessary to employ either an excess of halogenation agent or excessively high temperatures and pressures in order to reasonably halogenate and vaporize the majority of the selected metal present.

Many methods have been devised to enable the use of large quantities of reagents and to recover the excess reagent after securing the desired metal halides. Although some success in recovering reactants is experienced by employing these methods, a substantial portion of the excess halogen is still lost, thus making it uneconomical to refine many low-grade materials.

A process has now been devised whereby nearly all of the excess halogenation agent is recovered. By this process, low-grade concentrates and ores may be reacted near the temperatures of vaporization of the selected metal halide and without employing high pressures to the reaction chamber, thus effecting economical results previously not possible. This process has been found to be particularly adaptable and amenable to the extraction of columbium from low-grade columbium-bearing ores and concentrates. It has also been found to be adaptable to the removal of other constituents of ores and concentrates such as Ti, Zr, V, Mo, and Fe.

In general, the present invention is a method of removing metals, particularly columbium, from ores or concentrates. The ore or concentrate is contacted in a reaction chamber with carbon tetrachloride, which is an almost completely condensable chloridizing agent, in a quantity in excess of that required to form chlorides with all of the metals being removed. The reaction may be carried on at any temperature not lower than the vaporizing temperature of the desired metal chlorides. The resulting gases are condensed in liquid carbon tetrachloride which is continuously cooled and recycled as a quenching liquid. The resulting slurry of carbon tetrachloride and metal compound is preferably contacted with water at a temperature at least as high as the temperature that will vaporize the carbon tetrachloride but below the boiling point of water. The resulting water slurry is then further treated to remove the metal compounds.

It is, therefore, the object of the present invention to provide a process whereby selective metals may be obtained from low-grade ores or concentrates.

It is also an object of the present invention to provide a method of chloridizing metals in low-grade ores or concentrates and recovering substantially all of the excess chloridizing agent.

A further object of the present invention is to provide a method of chloridizing columbium with carbon tetrachloride and recovering a substantial portion of the excess carbon tetrachloride.

A still further object is to provide a method of economically separating columbium compounds from low-grade columbium-bearing ores or concentrates.

Other objects and advantageous features will be obvious from the following specification.

In the drawing:

The attached drawing is a flow sheet illustrating the preferred process of the present invention.

Pulverized low-grade ore or concentrate is introduced into the reactor 11 to form a fluidized bed. The temperature of the reactor 11 is maintained somewhat above the temperature of vaporization of the selected metal chlorides. Carbon tetrachloride is introduced into the reactor 11 in excess of that required to react with all the metal. The vaporized constituents are withdrawn from the reactor as at 12 and are conducted preferably through a hot cyclone dust collector 13 and then as shown by 14 into the top opening of wet cyclone 15. Carbon tetrachloride slurry, as at 16, from cooler 17 is introduced into the top side openings of the cyclone 15. The vaporized materials including the desired metal compounds are thus condensed in the carbon tetrachloride slurry and enrich the slurry. The carbon tetrachloride slurry containing all of the metal chlorides which were vaporized in the reactor 11 is withdrawn from the cyclone 15, as at 18, and preferably is conducted to a surge tank 19 which serves to control the rate of flow through the continuous cycle. Part of the carbon tetrachloride slurry is withdrawn from surge tank 19 and conducted to condenser cooler 17, as at 20, which may be a shell and tube heat exchanger and condenses carbon tetrachloride vapor or inert gases leaving the vent of the wet cyclone as well as cools the carbon tetrachloride slurry. This portion of the slurry is recirculated to the wet cyclone, as at 16, as quenching media. Another portion of carbon tetrachloride slurry containing chloride compounds is conducted, as at 21, to a hydrolysis chamber and steam distillation tank 22. Tank 22 is partially filled with water as illustrated at 23 which serves to hydrolyze many of the selected metal chlorides. Steam is introduced into the bottom of tank 22 in such controlled amounts as to maintain the temperature of the water at approximately 185° F. The steam also serves to maintain the water level. A water slurry containing the selected metal compound is drawn off tank 22, as at 24. Although most of the steam condenses and remains in the hydrolysis tank, some water vapor is carried out of the tank with the carbon tetrachloride vapors, as at 25. These gases are conducted into an overhead condenser 26 where they are condensed into a liquid mixture of carbon tetrachloride and water. This mixture is then conducted, as at 27, to a carbon tetrachloride-water separator tank 28 in which the two liquids, which are substantially immiscible in one another, separate. Thus, carbon tetrachloride may be withdrawn from the bottom fraction as at 29 and either is recycled into the fluidized bed reactor or into the wet cyclone, or is conducted to storage. The water, of course, is taken from the top fraction.

In reacting any ore or concentrate to avoid waste of reagent, it is highly desirable to remove as much as possible of the material within the ore or concentrate that may react with the reagent being employed, without materially affecting the selected metal concentration. It is, therefore, desirable to subject the ore or concentrate to conventional upgrading wherever possible. Such upgrading may be accomplished by appropriate conventional means such as flotation.

Temperature control of the chloridization chamber is most important in avoiding excess cracking of carbon tetrachloride to form noncondensable gases. Although the chloridization step may be carried on in many different types of reaction chambers, it is preferable to employ a fluidized bed reactor. This type of reaction chamber will provide an even temperature for the reaction and will not be subject to relative hot and cold areas. The ore or concentrate is finely divided and supplied to the reactor to provide a fluidized bed.

In reacting a low-grade ore or concentrate, the reaction chamber is preferably preheated to a temperature just slightly above the vaporization temperature of the desired metal chloride. For example, in reacting an ore or concentrate containing columbium, the reaction chamber is maintained at a temperature of at least 464° F. However, the preferred temperature in reacting ore or concentrate containing columbium is about 482° F. This, of course, may be commercially accomplished by preheating the ore or concentrate before introducing it into the reaction chamber. Although higher temperatures may be employed, it is desirable that the treatment temperatures be kept as low as possible, consistent with good extractions of selected metal compounds, such as columbium, and reasonable treatment times. Higher temperature may promote undesirable side reactions of carbon tetrachloride with other constituents which would consume additional reagents. Higher temperatures are also likely to increase corrosion rates in the reaction chamber as well as increase external heat requirements.

Cracking of carbon tetrachloride is undesirable in that some nonquenchable chlorine gas is formed. However, the cracking that occurs in the operating temperatures of the present process is so slight that it may be tolerated.

Carbon tetrachloride may be preheated to a temperature of approximately 302° F. to form carbon tetrachloride vapors before introducing it into the reaction chamber or fluid bed reactor. The temperature of 302° F. is approximately the temperature at which some cracking of carbon tetrachloride begins and, by using this temperature, the temperature of the reaction chamber will not be greatly lowered, while at the same time it will not be necessary to handle highly corrosive and toxic chlorine fumes, such as would be created by using higher temperatures.

The vaporized materials emitted from the reacting chambers may now be conducted through a conventional hot cyclone dust remover to remove solid materials carried out of the reactor with the vapors.

The reacted vapors and gases from the reaction chamber are now condensed in cool liquid carbon tetrachloride. It has been found that this may be effectively accomplished by conducting the gaseous products into a wet cyclone type of apparatus. The cyclone consists of a conical section with a large diameter at the top and a restricted diameter at the bottom. The vapors enter the top through a heated inlet to prevent condensation before contact with liquid carbon tetrachloride. The liquid enters tangentially at several points on the side near the top and is introduced with sufficient velocity to cause the liquid or condensing fluid to cling to the side of the conical walls due to centrifugal force, as it swirls to the opening at the bottom of the cone. In this manner the entire surface area of the conically shaped quenching vessel is covered with a layer of quenching liquid and a maximum surface area of liquid is exposed to the incoming vapors thus effectively condensing a maximum amount of vapor in a minimum amount of quenching liquid. A disengaging section with a vent for noncondensable gases may be attached to the lower end of the cyclone. If necessary, the gaseous elements may be conducted through several quenching apparatus, such as the above-described cyclone to complete quenching.

When employing a continuous operation, such as is illustrated in the accompanying flow sheet, it is advantageous at this point to conduct the quenched slurry through a surge tank to maintain a constant flow through the system. Part of this liquid, which is actually a carbon tetrachloride slurry containing condensed metal chlorides from continuous recycling through the quenching cyclone, is now conducted to a cooler condenser where carbon tetrachloride vapor or inert gases leaving the vent of the wet cyclone are further condensed. The cooler condenser also serves to further transfer sensible heat from the circulating carbon tetrachloride slurry. This portion of the carbon tetrachloride is then recycled through the quenching cycle.

Another portion of the carbon tetrachloride coming from the surge tank or the quenching cycle if no surge tank is employed is drawn off the system and further treated to secure the metal compounds and recover excess carbon tetrachloride.

Fresh liquid carbon tetrachloride may be introduced into the quenching cycle if necessary. However, as a practical matter, this is unnecessary because by using an excess of CCl$_4$ reagent in the fluidized bed reactor, sufficient carbon tetrachloride liquid is condensed in the quenching step to make up for that portion of the carbon tetrachloride slurry which is drawn off for the recovery of metal compounds.

It has been found advantageous to conduct that part of the slurry intended for removal of the metal compounds to a tank for hydrolysis. This tank is constructed to permit the addition of water, steam, and the slurry stream. An outlet for the resulting water slurry is provided near the bottom of the tank and an outlet for vapors is provided near the top of the tank. Water is provided to the tank preferably at approximately 185° F. and steam is introduced into the bottom of the tank at such a rate as to maintain the temperature of the tank at approximately 185° F. At this temperature the carbon tetrachloride will conveniently vaporize and pass out the top of the tank while the water in the bottom of the tank will contain substantially all the metal chlorides.

The water in the hydrolysis chamber should be maintained at a temperature below the boiling point of water. If the temperature is permitted to exceed the boiling point of water too much water escapes from the tower with the carbon tetrachloride vapor. The temperature of the water must be high enough to cause vaporization of the carbon tetrachloride to permit its removal from the chamber. This temperature may be as low as the boiling point of carbon tetrachloride and in some instances lower. The water and carbon tetrachloride may combine to form azeotropic mixtures which may have a boiling point below that of carbon tetrachloride. For this reason one may employ a temperature as low as about 153° F.

Steam distillation offers a convenient method of hydrolyzing the chlorides and purifying the recycled carbon tetrachloride in one step. In this procedure the hydrolyzed chlorides remain as a water slurry. Columbic oxide may be filtered out and washed.

In the hydrolysis procedure, the chlorides are mixed with water yielding a fine gelatinous precipitate and an acidic solution. During hydrolysis, metals such as columbium and silicon will precipitate as oxides while, if the pH is low enough, such metals as aluminum, iron, and titanium will dissolve and be washed away. With this procedure a product assaying about 55.8 percent columbium equivalent to about 79.8 percent columbic oxide can be recovered from low-grade ores.

The gases passing from the hydrolysis tank contain both water and $CCl_4$ vapor. These vapors are conveniently passed to a cooling chamber or heat exchanger where they may be easily condensed and then conducted to a separating tank where the condensed liquids, which are substantially insoluble in each other, will separate.

The following is an example illustrating one method of performing the process of the present invention and does not limit the invention to the example.

Beaucage ore from North Bay, Ontario, was finely ground to about −65 mesh. This ore had the following approximate analysis:

| | Percent |
|---|---|
| $Cb_2O_5$ | 0.7 |
| Si | 30–40 |
| Fe | 5–10 |
| Ti | .5 |
| $Al_2O_3$ | 5–6 |
| MgO and CaO | 5–6 |

The ore or concentrate had been previously treated to remove sulfides and carbonates by means of conventional flotation processes.

The reaction chamber was a 4-inch-diameter fluidized bed reactor. The ore or concentrate was supplied to the reactor to provide a fluidized bed at a rate of approximately 6.6 pounds per hour. The reaction chamber was maintained at a constant temperature of about 482° F. by means of external heating.

Vaporized $CCl_4$ was introduced into the reactor at a temperature of about 302° F. at a rate of 127 grams per minute which is approximately 10 times the theoretical amount required to react with the ore or concentrate. The vaporized gases were passed through a hot cyclone or dust collector where entrained dust was removed.

The hot gases were then passed into a cyclone through an opening at the top where they were quenched in a liquid carbon tetrachloride plus metal compounds from preceding quenchings in the continuous cycle. The liquid carbon tetrachloride slurry was introduced into the cyclone tangentially from the sides near the top at a rate of 4 gallons per minute so as to wet the entire inner wall of the cyclone which creates sufficient quenching surface to condense all or nearly all of the incoming vapors.

The quenched carbon tetrachloride plus precipitated metal compounds were then conducted into a surge tank from which the evenness of flow through the system was controlled.

Part of the slurry was withdrawn from the surge tank, passed through a water cooled shell and tube cooler or condenser and then back into the wet cyclone where it made up the 4 gallons per minute of quenching material being introduced into this chamber.

Another part of the slurry present in the surge tank was conducted to a hydrolysis tower. Inside the hydrolysis tower there was maintained a water level. Steam was introduced near the bottom in order to maintain the temperature of the water at approximately 167° F. and to maintain the water at a constant level. The hydrolysis tower was 2½ inches in diameter and approximately 18 inches high; the water level was maintained at about ½ the distance up the tower.

The slurry from the surge tank was introduced near the bottom of the tower beneath the water level.

Vapors were removed from the top of the hydrolysis tower. These vapors were conducted to a shell and tube heat exchanger where they were condensed and conducted to a separation tank where water and carbon tetrachloride were allowed to separate. The carbon tetrachloride was thus recovered for further use in the system.

Water, which now contained metal compounds, was withdrawn from the hydrolysis chamber. This slurry was quite acid (pH 0.1 to 0.5) and the solids were highly hydrated.

The slurry was partly neutralized to a pH of 4.0 to 4.5 with calcium carbonate. This caused flocculation of the solids.

The thickened slurry was filtered at a rate of 54.5 pounds per square foot per 24 hours on a vacuum filter with a canvas cloth. The filter cake contained 13.5 percent solids and, after drying at 220° F., still contained 24.5 percent water. All the water was removed by roasting at 932° F.

The major impurities present in the products were iron, titanium, and silicon; minor amounts of aluminum, magnesium, zirconium, and vanadium were also present. All of these impurities, except the silicon, are soluble in hydrochloric acid.

In order to leach the impurities from the primary product, it was necessary to roast the product at 750° F. prior to leaching. If the product was not roasted, it rehydrated to such an extent that filtration and washing of the leached material was very difficult.

The roasted material was slurried with dilute hydrochloric acid and was then filtered and washed with dilute acid and finally with distilled water. The cake was dried at 220° F. and ignited at 900° F.

The resulting product analyzed as follows:

| $Cb_2O_5$ | $Fe_2O_3$ | $SiO_2$ | $Al_2O_3$ | $TiO_2$ | $ZrO_2$ | MgO | $V_2O_5$ | $Na_2O$ |
|---|---|---|---|---|---|---|---|---|
| 79.8 | 2.2 | 9.9 | 1.3 | 1.3 | 0.15 | 0.3 | 0.2 | 0.3 |

What is claimed is:

1. In a method comprising halogenation of metal values for removal of a metal from metal-containing materials the combination of steps comprising: contacting said materials with vaporized carbon tetrachloride to form a chloride of the metal, said materials being maintained at a temperature at least as high as the vaporization temperature of the chloride of said metal and said vaporized carbon tetrachloride in a quantity in excess of that required to form the chloride of the metal; and condensing the excess vaporized carbon tetrachloride and the vaporized chloride of the metal by contacting with liquid carbon tetrachloride.

2. In a method comprising halogenation of metal values for removal of a metal from metal-containing materials the combination of steps comprising: contacting said materials with vaporized carbon tetrachloride to form a chloride of the metal, said materials being maintained at a temperature at least as high as the vaporization temperature of the chloride of said metal and said vaporized carbon tetrachloride in a quantity at least several times the stoichiometric amount required for reaction with the metal to form the chloride of the metal; condensing the excess vaporized carbon tetrachloride and the vaporized chloride of the metal by contacting with liquid carbon tetrachloride to form a slurry comprising carbon tetrachloride and the chloride of the metal; contacting the slurry with water at a temperature below the boiling point of water and at least as high as 153° F. to hydrolyze the chloride of the metal and to form vapors of water and carbon tetrachloride; condensing and separating said vapors into water and liquid carbon tetrachloride; and filtering said slurry after contacting with said water to obtain a hydrolysis product of the metal.

3. In a method comprising chlorination of a columbium value for removal of columbium from columbium-containing materials the combination of steps comprising:

contacting said materials with vaporized carbon tetrachloride to form chlorides of the columbium, said materials being maintained at a temperature at least as high as the vaporization temperature of the chlorides of columbium and said vaporized carbon tetrachloride in a quantity in excess of that required to form the chlorides of columbium; and condensing the excess vaporized carbon tetrachloride and the vaporized chlorides of columbium by contacting with liquid carbon tetrachloride.

4. In a method comprising chlorination of a columbium value for removal of columbium from columbium-containing materials the combination of steps comprising: contacting said materials with vaporized carbon tetrachloride to form chlorides of columbium, said materials being maintained at a temperature at least as high as 464° F. and said vaporized carbon tetrachloride in a quantity in excess of several times the stoichiometric amount to form the chlorides of columbium; and condensing the excess vaporized carbon tetrachloride and the vaporized chlorides of columbium by contacting with liquid carbon tetrachloride.

5. In the method of claim 4 the maintaining of the temperature of the materials at about 482° F. and the contacting with the vaporized carbon tetrachloride in a quantity of about ten times the stoichiometric amount.

6. In a method comprising chlorination of a columbium value for removal of columbium from columbium-containing materials the combination of steps comprising: contacting said materials with vaporized carbon tetrachloride to form chlorides of columbium, said materials being maintained at a temperature at least as high as 464° F. and said vaporized carbon tetrachloride in a quantity in excess of several times the stoichiometric amount to form the chlorides of columbium; condensing the excess vaporized carbon tetrachloride and the vaporized chlorides of columbium by contacting with liquid carbon tetrachloride to form a slurry comprising carbon tetrachloride and the chlorides of columbium; contacting the slurry with water at a temperature below the boiling point of water and at least as high as 153° F. to form columbium oxide and vapors of water and carbon tetrachloride; and filtering the slurry after contacting with said water to remove the columbium oxide.

7. In a continuous process comprising halogenation of metal values for removal of a metal from metal-containing materials the combination of steps comprising: continuously chloridizing said materials in a reaction chamber at a temperature at least as high as the vaporization temperature of the chloride of said metal with vaporized carbon tetrachloride as the chloridizing agent in a quantity in excess of that required to form the chloride of the metal to provide a continuous flow of volatilized gases containing vaporized metal chloride and some excess vaporized carbon tetrachloride; continuously contacting said gases in a condensing chamber with a liquid consisting essentially of liquid carbon tetrachloride to condense said vaporized metal chloride and carbon tetrachloride, while continuously withdrawing a portion of said liquid after contacting said gases, circulating the portion through a cooling chamber to cool the portion, and introducing the cooled portion to said condensing chamber; and withdrawing a portion of said liquid, after contacting said gases, for subsequent treatment to recover the metal.

8. In the continuous process of claim 7 continuously contacting the portion of said liquid withdrawn for subsequent treatment in a hydrolysis chamber with water at a temperature below the boiling point of water and at least as high as 153° F. to hydrolyze the chloride of the metal and to form vapors of water and carbon tetrachloride; removing and condensing said vapors to recover liquid carbon tetrachloride; and continuously removing a portion of said water and hydrolyzed chloride of the metal from said hydrolysis chamber for additional treatment to recover the metal.

9. In a continuous process comprising chlorination of a columbium value for removal of columbium from columbium-containing materials the combination of steps comprising: continuously chloridizing said materials in a reaction chamber at a temperature at least as high as the vaporization temperature of the chlorides of columbium with vaporized carbon tetrachloride as the chloridizing agent in a quantity in excess of that required to form the chlorides of columbium to provide a continuous flow of volatilized gases containing vaporized columbium chlorides and some excess vaporized carbon tetrachloride; continuously contacting said gases in a condensing chamber with a liquid consisting essentially of liquid carbon tetrachloride to condense said vaporized columbium chlorides and carbon tetrachloride, while continuously withdrawing a portion of said liquid after contacting said gases, circulating the portion through a cooling chamber to cool the portion, and introducing the cooled portion to said condensing chamber; and withdrawing a portion of said liquid, after contacting said gases, for subsequent treatment to recover the columbium.

10. In the continuous process of claim 9 continuously contacting the withdrawn portion of said liquid for subsequent treatment in a hydrolysis chamber with water at a temperature below the boiling point of water and at least as high as 153° F. to hydrolyze the columbium chlorides and to form vapors of water and carbon tetrachloride; removing and condensing said vapors to recover liquid carbon tetrachloride; and continuously removing a portion of said water and hydrolyzed columbium chlorides from said hydrolysis chamber for additional treatment to recover the columbium.

11. A method for condensing volatilized materials resulting from chlorination of materials with vaporized carbon tetrachloride as the chloridizing agent in a quantity in excess of that required to form chlorides of metal values contained in the materials and with the materials maintained at a temperature at least as high as the vaporization temperature of the chlorides comprising: introducing said volatilized materials into an opening in the top of a conically shaped vessel in which the top portion includes the large diameter of the conically shaped vessel and the bottom portion includes the apex of the conically shaped vessel; introducing a liquid consisting essentially of carbon tetrachloride tangentially through at least one opening in the side of the top portion of said vessel at a sufficient velocity to cause said liquid to swirl in a surface film over the interior of the conically shaped vessel to the bottom portion of the vessel; and withdrawing said liquid through an opening in the bottom portion of the vessel.

12. In a continuous process comprising chlorination of metal values for removal of a metal from metal-containing materials the combination of steps comprising: continuously chloridizing said materials in a reaction chamber at a temperature at least as high as the vaporization temperature of the chloride of said metal with vaporized carbon tetrachloride as the chloridizing agent in a quantity in excess of that required to form the chloride of the metal to provide a continuous flow of volatilized gases containing vaporized metal chloride and some excess vaporized carbon tetrachloride; continuously introducing said gases into an opening in the top of a conically shaped vessel in which the top portion includes the large diameter of the conically shaped vessel and the bottom portion includes the apex of the conically shaped vessel; continuously introducing a liquid consisting essentially of carbon tetrachloride tangentially through at least one opening in the side of the top portion of said vessel at a sufficient velocity to cause said liquid to swirl in a surface film over the interior of the conical shaped vessel to the bottom of the vessel; continuously withdrawing said liquid through an opening in the bottom portion of the vessel; continuously circulating a portion of the liquid withdrawn through the opening in the bottom portion through a cooling chamber to cool said portion of the liquid and introducing the cooled portion of the liquid tangentially through an opening in the side of the top portion of the vessel; and continuously removing a portion of the liquid withdrawn through the opening in the bottom portion of the vessel for subsequent treatment to recover the metal.

13. The continuous process of claim 12 in which the continuous chloridizing provides gases containing vaporized columbium chlorides.

References Cited in the file of this patent

UNITED STATES PATENTS

| | | |
|---|---|---|
| 2,245,358 | Pechukas | June 10, 1941 |
| 2,306,184 | Pechukas | Dec. 22, 1942 |
| 2,311,466 | Pechukas | Feb. 16, 1943 |
| 2,718,279 | Kraus | Sept. 20, 1955 |

OTHER REFERENCES

May et al.: Industrial and Engineering Chemistry, December 1954, vol. 46, No. 12, pages 2495–2500.